Patented Oct. 2, 1934

1,975,213

UNITED STATES PATENT OFFICE 1,975,213

PROCESS FOR MAKING LIGHT FLUFFY MATERIAL

Walter Hoge MacIntire, Knoxville, Tenn., assignor to American Zinc, Lead & Smelting Company, St. Louis, Mo., a corporation of Maine No Drawing. Application August 2, 1932, Serial No. 627,306

10 Claims. (Cl. 23—66)

This invention relates to a process for making precipitated carbonates of magnesium and calcium and more particularly a double or dolomitic precipitate including carbonated magnesium and calcium.

One of the objects of the invention is to provide a novel process for treating substances containing magnesium and calcium oxides so as to provide a double or dolomitic precipitate comprising both magnesium carbonate and calcium carbonate.

Another object is to provide a novel process for treating calcined dolomite and similar materials whereby a light fluffy material is provided which comprises carbonates of calcium and magnesium.

In carrying out the process of the invention, the starting materials generally speaking comprise natural or prepared materials which are rich in magnesium and calcium oxides. Where the magnesium and calcium occur in other forms, the material is preferably calcined to produce oxides of magnesium and calcium. Dolomite, for example, is a natural material which after calcination contains both calcium oxide and magnesium oxide in large quantities. Other materials such as near dolomite, high magnesium limestone, and the like are also suitable for the process, but for purposes of illustration the starting material is referred to hereafter under the name of "dolomite".

The natural dolomite is first calcined fully and the calcined product is suspended in water. While the proportions of calcined dolomite and water may vary somewhat, satisfactory results have been obtained when using 10 parts of the calcined dolomite and about 120 parts of water. Ammonia gas is then added to the water, preferably in the proportion of 0.5 part of ammonia to 10 parts of solid material, the ammonia being introduced in the form of gas and preferably in a closed system in order to effect the subsequent recovery of the added ammonia, although the process may if desired be carried out in open containers.

The mix of calcined dolomite, water and ammonia, is preferably agitated vigorously and carbon dioxide is added intermittently in quantities sufficient to complete the desired reaction thereof with the calcium and magnesium oxides. During the addition of $CO_2$, the temperature of the mix or magma increases due to the heat of reaction and when the influx of $CO_2$ is completed, the temperature has become relatively high. This high temperature assists in completing the reaction, particularly if the heat is conserved by insulating the reaction chamber carefully, so that a product of good quality is obtained. It has been found, however, that if additional or supplemental heat is applied to the magma after the influx of $CO_2$ is completed, the product obtained is superior to that obtained when no supplemental external heat is employed. Accordingly the mix or magma is preferably heated following the addition of $CO_2$ to a temperature of approximately 100° C. by the application of dry heat in any suitable manner, whereupon the mix thickens or gels very quickly. In tests made the period of application of supplemental heat has been 15 to 30 minutes, but it will be understood that this period is variable and may depend on the amounts of the charges to be used. After the thickening of the mix takes place, either with or without the use of external heat as may be the case, the thickened mass is freed of any excess of water through suitable means such as filtration by suction and is subsequently dried in vacuo.

The amount of ammonia used in carrying out the reaction is materially less than the chemical equivalent of the amount of carbon dioxide added, which chemically equivalent quantity would be required in case the ammonia and carbon dioxide were added in combination, for example, in the form of ammonium carbonate. As the calcined material is transformed into the precipitate, ammonia is liberated under the conditions of the process and then used again in the reaction, the ammonia thus entering into a cyclical reaction and functioning analogously to a catalytic or carrier agent. Hence the amount of ammonia required is a minimum, and moreover, this feature of the process contributes to the resulting lightness and fluffiness of the precipitated product.

As stated above, the influx of carbon dioxide is preferably intermittent. While the amount of carbon dioxide to be added can vary considerably, it has been found that excellent results are obtained when the amount of carbon dioxide added is equivalent to 85% to 90% of the carbon dioxide content of the original dolomite from which the calcined oxides were obtained. Preferably the influx of carbon dioxide is continued until the pressure within the reaction chamber approximates one-fifth of an atmosphere, whereupon the influx is discontinued until the pressure in the reaction chamber returns to normal atmospheric pressure, and this procedure is repeated until the total amount of $CO_2$ has been added. In practice the time during which the influx of $CO_2$ takes place may be approximately ten minutes under the conditions set forth above but it will be understood that this time can be increased or shortened depending upon the conditions which exist in any particular case. The conditions should preferably be arranged so that all of the proper measured quantity of $CO_2$ is added by the time that the mass thickens.

The product obtained in this manner is exceedingly light and fluffy and is an excellent material for insulating purposes and for other uses for which precipitated magnesium carbonate and like products are adapted. Specimens of this product when examined under a powerful (800X) microscope appear to comprise a double salt of calcium carbonate and magnesium carbonate, no differentiation being discernible between the two carbonates. The apparent density of this product may vary somewhat but compares very favorably in lightness with the commercially accepted standard of apparent density for magnesium carbonate of .15. Whether the precipitated material is a double carbonate of calcium and magnesium or a very intimate and homogeneous mixture of calcium carbonate and hydrated magnesium carbonate, it is in any event very much lighter and fluffier than a corresponding mechanical mixture of these two carbonates as obtained by separate operations. A sample of white Georgia dolomite, treated with a minimum amount of ammonia, intermittent addition of $CO_2$ and supplemental heat as described above, resulted in a precipitate having an apparent density of .10. When the process is carried out without added heat, the apparent density of the product is somewhat greater. For example, a sample of Georgia white dolomite treated with intermittent influx of $CO_2$, minimum quantity of ammonia, and without added heat resulted in a precipitate having an apparent density of .19. In all cases the resultant products are exceedingly light and fluffy and are well adapted for various uses, for example, as insulating materials.

While the term "dolomite" is used in the specification and in some of the claims, it is the intent and it is to be understood that this term includes not only true dolomite but also similar materials such as near dolomite and high magnesium limestone, etc. It is also to be understood that the invention is not restricted to the examples given, since the proportions of the materials and the details of the process are susceptible of variations that will be apparent to those skilled in the art. For example, the time required for the influx of $CO_2$, the period of heat application necessary to thicken the mass, the proportions of calcined dolomite to water and to ammonia, and other factors may be varied without departing from the spirit of the invention. Reference is therefore to be had to the appended claims for a definition of the limits of the invention.

What is claimed is:

1. A process for making a light precipitated material which consists in suspending a material rich in calcium and magnesium oxides in water, adding ammonia gas to the suspension, and then adding carbon dioxide to the mix to form a double precipitate of calcium and magnesium carbonates.

2. A process for making a light precipitated material which consists in suspending a material rich in calcium and magnesium oxides in water, adding ammonia gas to the suspension, and then adding carbon dioxide to the mix to form a double precipitate of calcium and magnesium carbonates, the quantity of ammonia being substantially less than the chemical equivalent of the carbon dioxide that combines with the magnesium and calcium.

3. A process for making a light precipitated material which consists in suspending a material rich in calcium and magnesium oxides in water, adding ammonia gas to the suspension, then adding carbon dioxide to the mix, and supplying supplemental heat to the mix, whereby a double precipitate of calcium and magnesium carbonates is formed.

4. A process for making a light precipitated material which consists in suspending a material rich in calcium and magnesium oxides in water, adding ammonia gas to the suspension, then adding carbon dioxide to the mix, and supplying supplemental heat to the mix, whereby a double precipitate of calcium and magnesium carbonates is formed, the quantity of ammonia being substantially less than the chemical equivalent of the carbon dioxide that combines with the magnesium and calcium.

5. A process for making a precipitated and carbonated material similar chemically to dolomite but differing physically therefrom which consists in suspending calcined dolomite in water, adding a minimum amount of ammonia gas to the suspension, adding carbon dioxide to the mix, and supplying supplemental heat to the mix, the amount of ammonia being small in proportion to the chemical equivalent of the carbon dioxide added.

6. A process for making a precipitated and carbonated material similar chemically to dolomite but differing physically therefrom which consists in suspending calcined dolomite in water, adding a minimum amount of ammonia gas to the suspension and adding carbon dioxide to the mix while subjecting it to vigorous agitation until thickening takes place, the amount of ammonia being small in proportion to the chemical equivalent of the carbon dioxide added.

7. A process for making a precipitated and carbonated material similar chemically to dolomite but differing physically therefrom which consists in suspending calcined dolomite in water, adding ammonia gas to the suspension in the approximate proportion of one-half part of ammonia to ten parts of calcined dolomite, and adding carbon dioxide while vigorously agitating the mix until thickening takes place.

8. A process for making a precipitated and carbonated material similar chemically to dolomite but differing physically therefrom which consists in suspending calcined dolomite in water, adding ammonia gas to the suspension in the approximate proportion of one-half part of ammonia to ten parts of calcined dolomite, adding carbon dioxide to the mix, and supplying supplemental heat to the mix until thickening takes place.

9. A process for making a precipitated and carbonated material similar chemically to dolomite but differing physically therefrom which consists in suspending calcined dolomite in water in the approximate proportion of ten parts of dolomite to one hundred twenty parts of water, adding approximately one-half part of ammonia gas to the suspension, agitating the mix vigorously while adding carbon dioxide thereto, and supplying supplemental heat to the mix until thickening takes place.

10. A process for making a precipitated and carbonated material similar chemically to dolomite but differing physically therefrom which consists in suspending calcined dolomite in water in the approximate proportion of ten parts of dolomite to one hundred twenty parts of water, adding approximately one-half part of ammonia gas to the suspension, and adding carbon dioxide to the mix while subjecting it to vigorous agitation until thickening takes place.

WALTER HOGE MacINTIRE.